United States Patent
Berkowitz et al.

(10) Patent No.: US 7,870,272 B2
(45) Date of Patent: Jan. 11, 2011

(54) PRESERVING A USER EXPERIENCE WITH CONTENT ACROSS MULTIPLE COMPUTING DEVICES USING LOCATION INFORMATION

(75) Inventors: David Berkowitz, Palo Alto, CA (US); Matthew William Crowley, Los Altos, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 388 days.

(21) Appl. No.: 11/567,178

(22) Filed: Dec. 5, 2006

(65) Prior Publication Data

US 2008/0133529 A1 Jun. 5, 2008

(51) Int. Cl.
*G06F 15/16* (2006.01)
(52) U.S. Cl. .................. 709/229; 709/217; 709/219
(58) Field of Classification Search .......... 709/223, 709/238, 240, 231, 217, 219, 229
See application file for complete search history.

(56) References Cited

U.S. PATENT DOCUMENTS

| | | | |
|---|---|---|---|
| 7,062,567 B2 * | 6/2006 | Benitez et al. ............. 709/231 |
| 7,064,675 B2 * | 6/2006 | Zigmond et al. ......... 340/825.72 |
| 7,127,735 B1 * | 10/2006 | Lee et al. ........................ 725/87 |
| 7,206,559 B2 * | 4/2007 | Meade, II ................ 455/151.1 |
| 7,272,405 B2 * | 9/2007 | Maillard ................... 455/456.5 |
| 2005/0228859 A1 | 10/2005 | Maeda |
| 2006/0190559 A1 | 8/2006 | Lim |

FOREIGN PATENT DOCUMENTS

WO    WO 03/017082 A1    2/2003

OTHER PUBLICATIONS

PCT International Search Report and Written Opinion, PCT Application No. PCT/US07/85812, Jun. 26, 2008, 9 pages.

* cited by examiner

*Primary Examiner*—Hussein A Elchanti
(74) *Attorney, Agent, or Firm*—Fenwick & West LLP

(57) ABSTRACT

A content management system stores location information indicating a location within a content item where a user exited from or last-accessed the content item. This location information is synchronized or otherwise shared between or among a plurality of devices associated with the user. With this information stored on or accessible to these multiple devices, the system enables the user to start from that location when subsequently accessing the content item on any of these devices. The user's experience with the content item is thus preserved over time and independently of the device on which the content item is accessed.

27 Claims, 11 Drawing Sheets

PRESERVING A USER EXPERIENCE WITH CONTENT ACROSS MULTIPLE COMPUTING DEVICES USING LOCATION INFORMATION

BACKGROUND OF THE INVENTION

1. Field of the Invention

The present invention relates generally to content management, and more specifically, to preserving a user's experience with content across multiple computing devices.

2. Description of the Related Art

More and more people are using diverse hardware devices and software applications to experience content items (e.g., files or information). Many content items in the form of digital data are nowadays compatible across various computing devices (e.g., an MP3 player, a personal computer, or a PDA). For example, someone can listen to an MP3 file using a portable MP3 player as well as a personal computer or a PDA. As our computing devices such as portable communication devices become more powerful, people are presented with increasing number of computing devices to access the content items. The problem occurs when someone is accessing content item on one device, stops, and then accesses the content item from another device. Presently, there is no acceptable way to preserve the user's experience on one device.

Conventional applications generally do not store a location where the user previously stopped accessing a content item. As a result, when the user subsequently plays the same content item, the user must search manually for the previous location of the content item to avoid viewing or listening to portions of the content item previously experienced. Searching for the previous exit point of a content item is inconvenient and time-consuming for the user, especially when the content item has a long running time or when the application supports limited or no search functionality.

Some conventional applications store and retrieve previous location of the content items after accessing the content items. For example, a media player may store the location where a user left off in the previous play of an audio file. When the user subsequently accesses the same audio file, the media player continues the audio file from the previous location. Therefore, a user of the media player can continue the audio file without searching for the previous location in the audio file. But even for applications in which previous locations are stored, information indicating the previous location in a content item (hereinafter referred to as "location information") generated by one application is not usable in a different application. The location information for applications is generally stored in a file accessible to or compatible with only the applications that generated the location information. Therefore, even when there is a file including the location information on the computing device, a user may still have to manually search for the previous location in the media file when the user accesses the content item using a different application.

It is more problematic when the same content item is accessed by different computing devices. Someone using multiple computing devices must search for previous locations of a content item where he discontinued the content item every time he changes the computing device in order to avoid repeating the portion of a content item he already experienced. When multiple computing devices are used to access the same content item, a file including the location information of the content item may not be present on the computing device that the user is attempting to use. This makes it more difficult to implement content management that allows a user to automatically continue accessing the content item from a location where the user discontinued from a prior access to the content item.

This inconvenience is not limited to time-based content item, such as audio or movie files. Users accessing static content items on different computing devices can also experience the same inconvenience. A static content item is a content item that does not incorporate time-based video or audio files and thus remains the same regardless of progress in time. An internet webpage consisting only of text and picture files is an example of the static content item. Even for such static content item, the location information can improve a user's experience and efficiency. For example, a person uses a personal computer at office to work on a static content item, in this case a MSword or Excel document, and then returns home to work on the same document using another personal computer. The reader may waste his time searching for the page or line of the document where he previously left off. The time can be saved if the user can automatically access the previous location (i.e., page and line of the document) after switching to a different computing device.

Therefore, there is a need for a content management method and device that allows a user to experience content items consistently and efficiently regardless of changes in the computing devices or applications used by the user. Further, there is a need for a content management method and device to automatically continue the content item from the location in the content item where the user previously left off.

SUMMARY OF INVENTION

An embodiment of the present invention provides a method of managing content item which stores location information indicating a location in a content item where a user discontinued the content item on a computing device so that the user can continue from that location when subsequently accessing the same content item. Upon discontinuing access of the content item, the location information is generated or updated by the computing device to indicate the location in the content item where the user discontinued.

The content item of the present invention includes all types of content items including both time-based content items and static content items. The time-based content items are content items that appear, update or disappear with progress of time. The time-based content items include, among other contents items, audio, video, automatically updated weather information, news, stock price updates, and auto-advancing presentations and messages. The static content items remain constant with the progress of time. The static content items include, among other content items, still photos and texts.

The computing device of the present invention refers to physical or logical devices that allow the user to access the content items. Common computing devices include personal computers, MP3 players, smart phones, PDAs, and video game consoles. Multiple computing devices can be implemented on a single device. For example, a personal computer with multiple operating systems (e.g., Microsoft Windows, and Linux) or virtual machines (e.g., VMware, and Xen) can have multiple logical computing devices on a single physical device.

The location information can be any addresses within any addressable content items. For the time-based content items, the location information can indicate, among others, the off-set time from the start of the content items. For a static content item, the location information can indicate, among others, a Uniform Resource Locator (URL) address, page, paragraph, column or line of the static content item.

An application is any application program that can be operated on a computing device to access the content item. Popular applications include, video and music players (e.g., Pocket Tunes, Kinoma, Windows Media Player, RealPlayer, iTunes, PowerDVD, QuickTime, and Winamp), web browsers (e.g., NetFront, Microsoft Internet Explorer, Mozilla Firefox, and Apple Safari), image viewers (e.g., VD Image Viewer, and ADCSee), document viewers (e.g., Adobe Acrobat), and word processor applications (e.g., Documents To Go, Microsoft Word, and WordPerfect).

A location manager may be provided on the computing device to generate and retrieve the location information. The location manager in the computing device may operate in conjunction with applications on the computing device to allow users to continue the content items from the location in the content item where he previously discontinued the content item.

In one embodiment, the computing devices synchronize or update their location information using a remote server. The remote server receives the location information from a first computing device when the user discontinues the content item and sends the location information to a second computing device when the user accesses the content item on the second computing device. The remote server may include a user account database that stores the location information for each user.

In another embodiment of the present invention, the computing devices synchronize or update their location information using a peer-to-peer communication without the use of the remote server. The computing devices can store the location information on synchronization information storages provided locally on the computing devices. When the peer-to-peer communication is initiated the computing devices update their location information so that it is consistent with that of communicating computing devices.

The content item can be stored in various places. In one embodiment, the content item is stored locally on the computing device. In another embodiment, the content item is stored on the remote server. In yet another embodiment, the content item is stored on a content source provided by a third party service provider. The remote server may cache the content items provided by the third party service provider to improve access speed to the content item by the computing device.

In one embodiment, a method for preventing conflict of the location information is provided. The remote server may deny access to the content item to a computing device if the content item is already being accessed by the user on another computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF EMBODIMENTS

Figure 1:
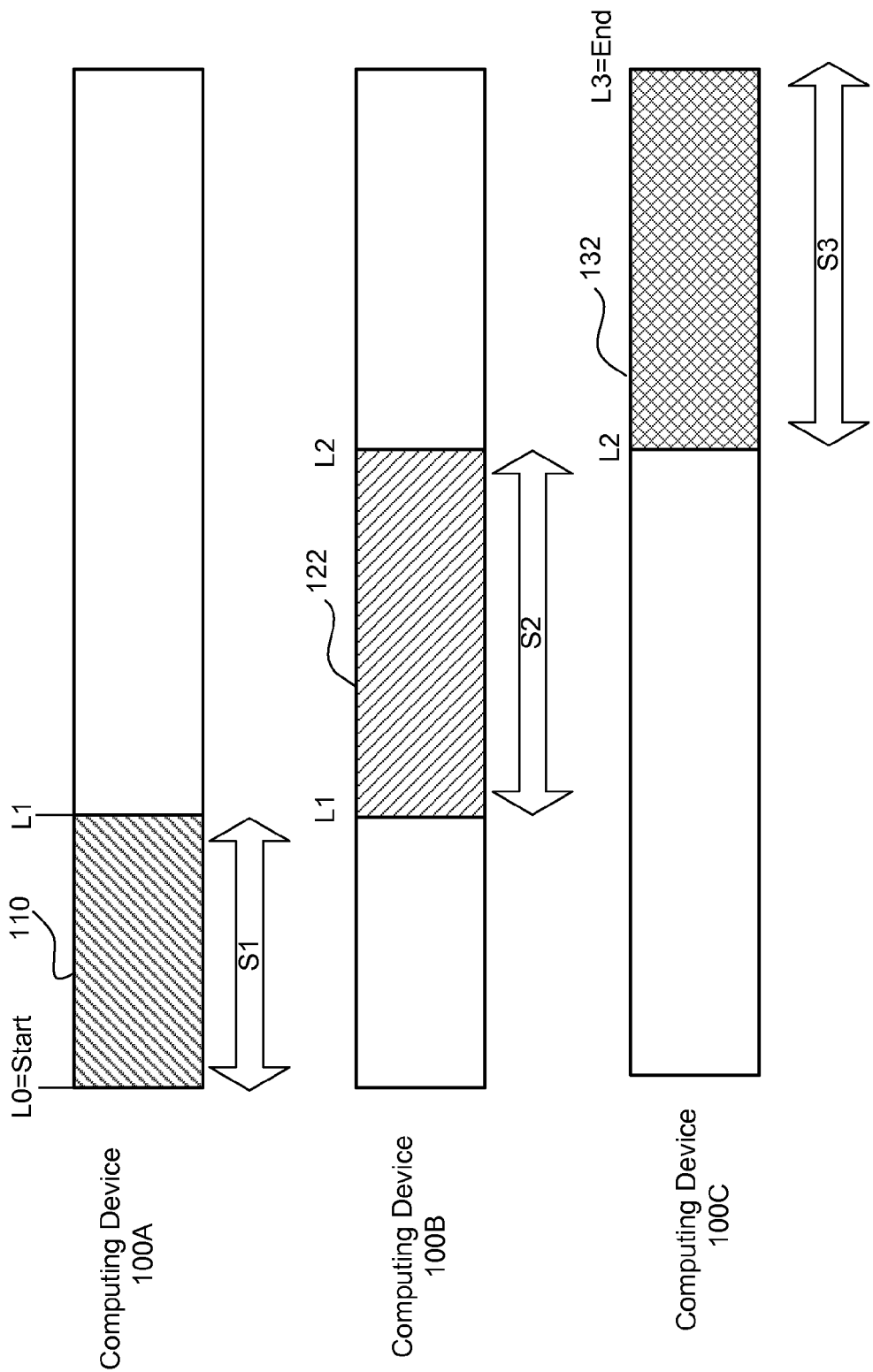
FIG. 1 is a diagram showing a content item being accessed by a user using different computing devices according to an embodiment of the present invention.

The embodiments of the present invention will be described below with reference to the accompanying drawings. Like reference numerals are used for like elements in the accompanying drawings.

Overview of Content Management Using Location Information

FIG. 1 is a diagram showing a content item being accessed by a user using different computing devices according to an embodiment of the present invention. In FIG. 1, L0 and L3 denote the start and end of the content item, respectively. In session S1, the user accesses the content item for the first time on a computing device 100A using an application. After viewing or listening to a portion 110 of the content item, the user discontinues the content item at point L1. Then, the user starts another session S2 in which the user accesses the same content item on a different computing device 100B using the same application. In the session S2, the content item is automatically accessed from the point L1. After accessing a portion 122 of the content item, the user discontinues the content item at a point L2. In session S3, the user accesses the same content item on a computing device 100C using the same application. The content item is automatically accessed from the point L2. Because the content item starts from the location where the user previously left off, the user does not have to spend time manually searching for the locations where the user discontinued the content item in previous sessions.

Various content items may benefit from the present invention. Examples of content items that can benefit by accessing at a location where the user left off in previous sessions include, among other content items, video or audio files, video or audio streams, text files, emails, documents, audio books, web pages, webcasts, podcasts, e-books, and games. Content items can also be a list or history of individual files to be accessed. For example, the content items can be a playlist of MP3 files to be played, or a history of web sites visited by a web browser in a single session.

Depending on the types of content items, a "location" in the content item can refer to different attributes. In a time-based content item, the location can generally be identified by the time elapsed after the start of the content item, although other attributes such as number of frames elapsed from the first frame of the content item may also be used. In a static content item, the location can be identified by logical units of the content item, for example, pages for e-books, URL addresses for web pages, and pages or lines for documents. If the content item is a list or history of individual files to be accessed, the location can a file name, a file number or a sequential number. For example, the location can be a song number in a MP3 file playlist or a file number for a series of short clips that in combination form a movie.

In order to implement the functionality of continuing the content item from a previous session, embodiments of the present invention use the concept of "location information." The location information may comprise various attributes that can indicate a location within a content item. For example, for a time-based content item, the location information may indicate the time elapsed after the user exits the content item in a session. For a static content item, the location information may indicate pages, columns or lines viewed by the user in a previous session. As will be explained further below, embodiments of the present invention share the location information with multiple platforms to enable the user to continue a content item from the location where the user previously left off.

For time-based content items such as video or audio streams, a real world time (e.g., year, month, date, hour, minute and second) may also be used to indicate the location where the user discontinued access to the content items. For example, when a streaming video broadcast is interrupted by the user (e.g., stop playing) or due to network traffic conditions, the location information can indicate the interrupted real world time of play (e.g., Dec. 1, 2006, 10:14:40 AM). The user may re-access the same streaming video broadcast later, and can start viewing the streaming video broadcast from the interrupted time of play.

Architecture with a Remote Server

Figure 2:
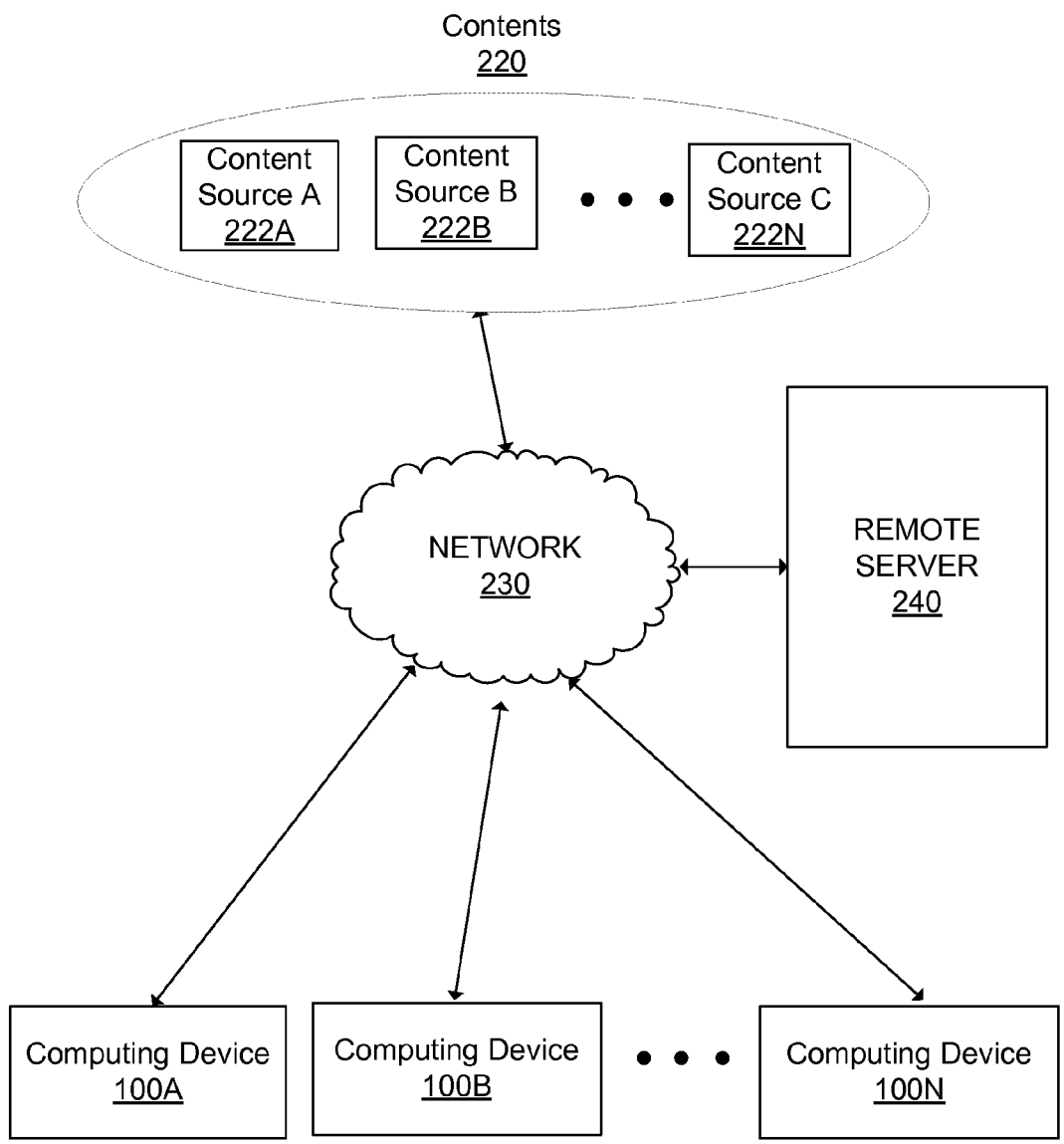
FIG. 2 is a diagram illustrating a network structure including multiple computing devices and a remote server according to an embodiment of the present invention.

FIG. 2 is a diagram illustrating schematic network architecture including a remote server 240 according to an embodiment of the present invention. Each of the computing device 100A through 100N is generally referred to as computing devices 100. The remote server 240 communicates with the computing devices 100 through a network 230. As will be explained below in detail with reference to FIGS. 5 and 6, the remote server 240 stores location information of content items for sharing by the computing devices 100. The network 230 can be in any form including: the internet, cable TV network, PSTN (Public Switched Telephone Network), radio network, cellular network, satellite TV network, WI-FI network, workplace enterprise network, and any combination thereof.

The computing devices 100 can be various devices capable of accessing the content items. For example, the computing device 100 can be a personal computer, an MP3 player, a mobile phone, a smart phone, a PDA (Personal Digital Assistant), or a video game console. In one embodiment, the computing devices are disparate devices with different hardware and/or software configurations. For example, a computing device 100A is a laptop computer with Microsoft Windows operating system, and another computing device 100B is a PDA with Palm operating system. In another embodiment, all of the computing devices have similar software and hardware configurations. For example, the computing device 100a is a desktop computer with Microsoft Windows operating system, and the computing device 100b is a laptop computer with the same Microsoft Windows operating system.

The content items can be stored locally on the computing devices 100 or it can be accessed remotely from the remote server 240 or content sources 222 (each of the content sources 222A through 222N is generally referred to as content sources 222, all of which are collectively called remote contents 220). File storage for the computing device and the remote server is explained below in detail with reference to FIGS. 3, 5 and 6. The contents sources 222 can be services provided by various third-party content providers, such as YouTube, Google, Audible, JAlbum, and eBooks.com, and any of a variety of other providers. Depending on the content items, the remote server 240 may cache the content items available from the content sources 222 to allow faster access by the computing devices 100.

In addition, the remote server 240 may convert the content items available from the content sources 222 to a format compatible with certain computing devices 100. For example, if the computing device 100A is a mobile phone, the remote server 240 may convert the HTML based contents to a WAP (Wireless Application Protocol) compatible format to allow access to the content item by the mobile phone.

Computing Device Structure

Figure 3:
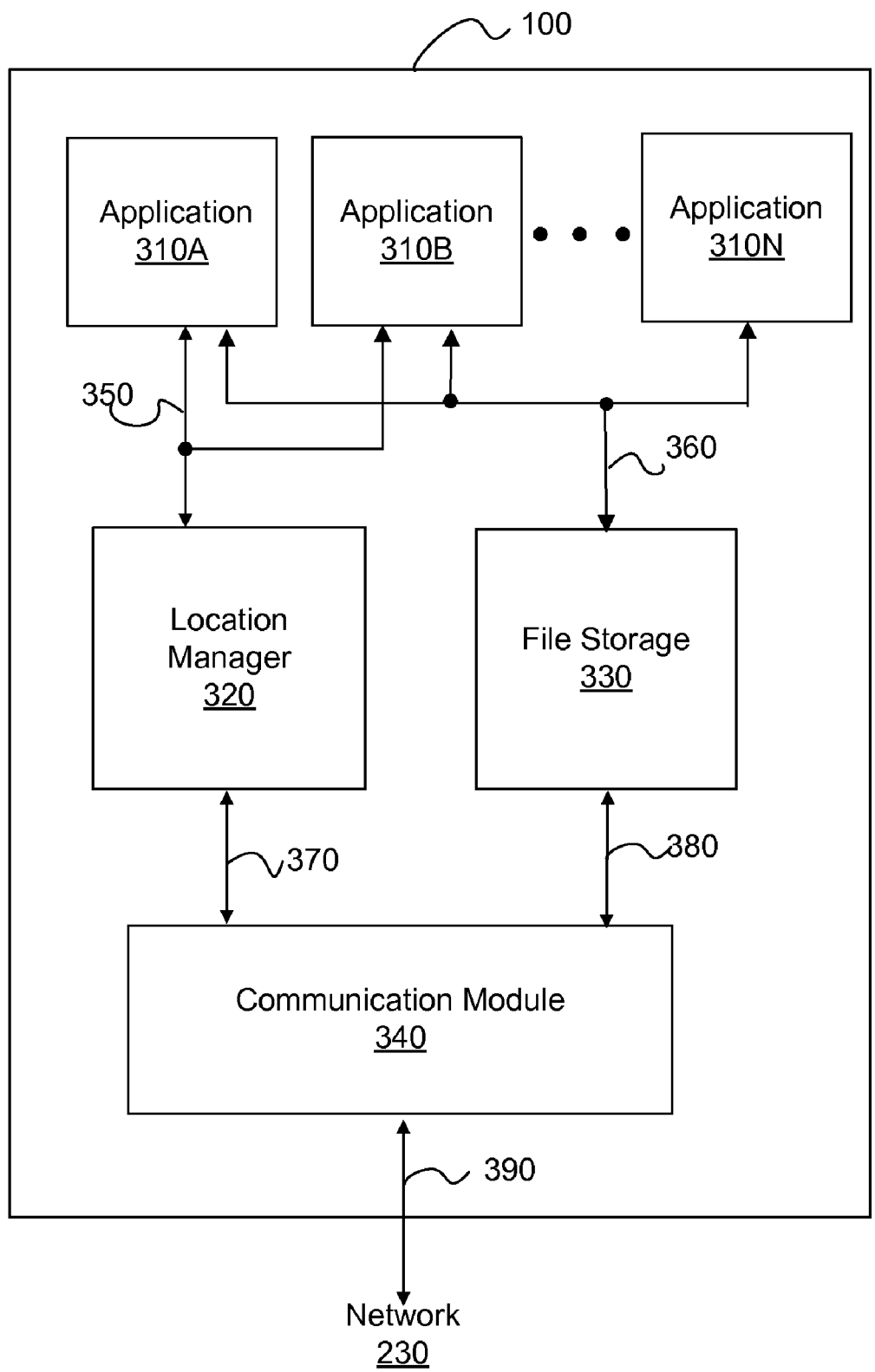
FIG. 3 is a block diagram illustrating the computing device according to one embodiment of the present invention.

Referring to FIG. 3, the computing device 100 according to an embodiment of the present invention includes, among other elements, applications 310 (each of applications 310A through 310N is generally referred to as the applications 310), a location manager 320, a file storage 330, and a communication module 340. The applications 310 load the content items from the file storage 330 and allow the user to experience the content items. The applications 310 can be applications such as video and music players, web browsers, image viewers, document viewers, and word processors. Popular applications include, among other applications, Pocket Tunes, Kinoma, Windows Media Player, RealPlayer, iTunes, PowerDVD, QuickTime, Winamp, NetFront, Microsoft Internet Explorer, Mozilla Firefox, Apple Safari, VD Image Viewer, ADCSee, Adobe Acrobat, Documents To Go, Microsoft Word, and WordPerfect. One application 310 may allow the user to access only one type of content items, or it may allow the user to access multiple types of content items.

Multiple applications 310 may be provided in the computing device 100 (as shown in FIG. 3), although a single application may be provided in a computing device. Also, different computing devices 100 may include different applications. Each of these functional components can be implemented separately or can be implemented together. For example, the application 310 and the location manager 320 can be implemented as one module. Moreover, each component, whether alone or in combination with other components, can be implemented for example, in software, hardware, firmware or any other combination thereof.

The file storage 330 can be implemented by various storage devices including, a flash memory device, a hard disk, a floppy disk, and Random Access Memory (RAM). In one embodiment, the file storage 330 is integrated onto a memory device (e.g., hard disk or RAM) storing content items along with other software such as operating system files. In another embodiment, the file storage 330 is a memory device (e.g., video game cartridge) storing only certain types of content items. The file storage 330 communicates with the application through a data bus 360. The file storage 330 may store a whole content item or a portion of the content item. For a streaming content item, the file storage 330 may store only a small portion of the content item sufficient for buffering.

The communication module 340 communicates with other computing devices 100, the content sources 222, and the remote server 240 through the network 230. The communication module 340 communicates with the location manager 320 and the file storage 330 using data buses 370 and 380. The communication module 340 uses a channel 390 to communicate with the network 230.

The location manager 320 manages the location information. When the user attempts an access to the content items using the application 310, the application 310 notifies the attempt to the location manager 320 through a data bus 350. In response, the location manager 320 communicates with the remote server 240 through the communication module 340 to confirm if location information (corresponding to the user and the content item) is available from the remote server 240. The location manager 320 informs the application manager 310 of the location information obtained from the remote server 240. The location manager 320 also generates or updates the location information when the user discontinues access to the content item. The updated location information is then send to the remote server 240. The process of communicating between the location manager 320, the applications 310, the file storage 430, the content sources 222, and the remote server 240 is explained below in detail with reference to FIG. 7.

Figure 4:
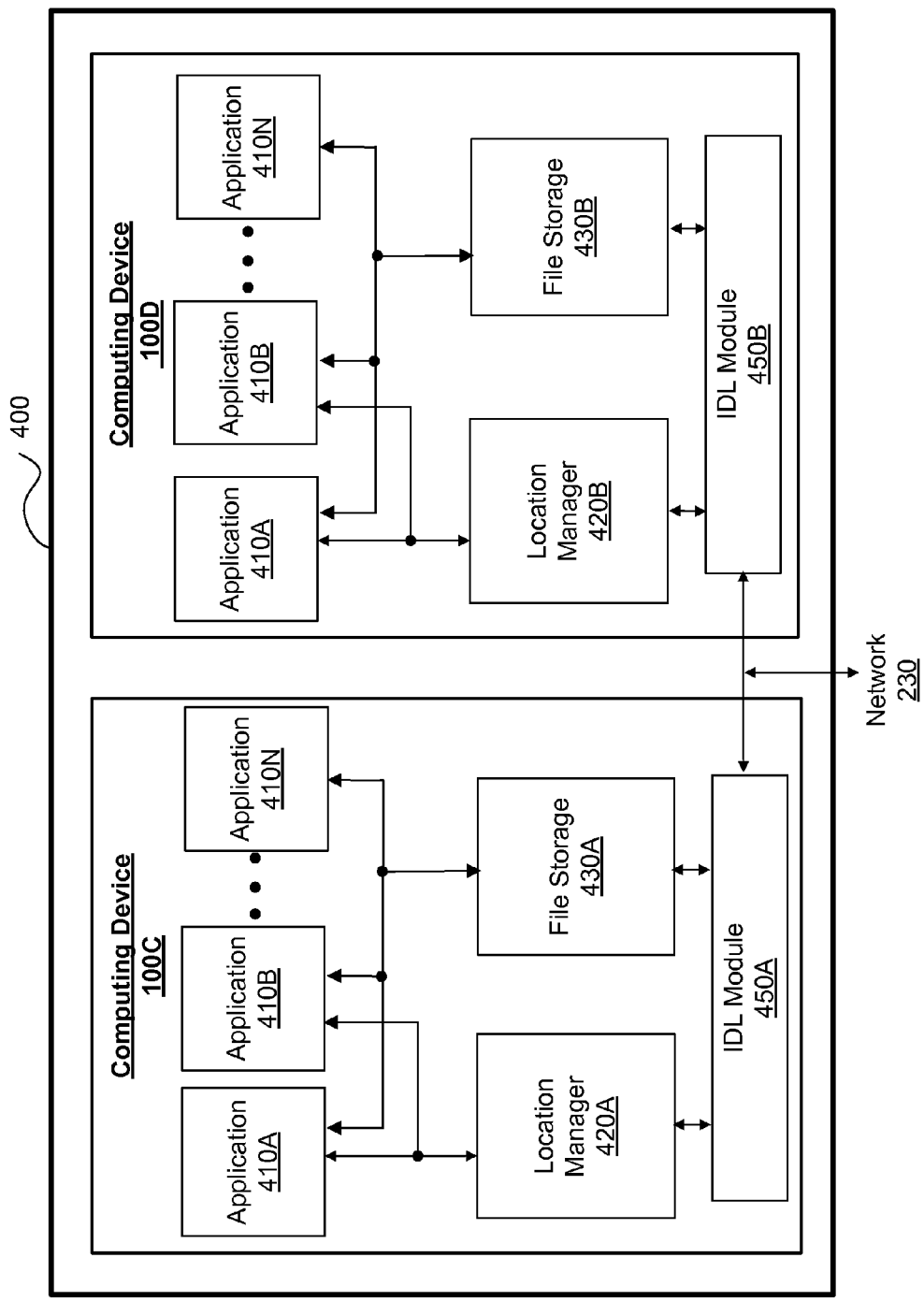
FIG. 4 is a block diagram illustrating a device operating multiple computing devices according to another embodiment of the present invention.

Multiple computing devices can be implemented on a single physical device. For example, a personal computer with multiple operating systems (e.g., Microsoft Word, and Linux) or virtual machines (e.g., VMware, and Xen) can have multiple logical computing devices on a single physical device. FIG. 4 is a block diagram illustrating a device operating multiple computing devices according to one embodiment of the present invention. Both computing devices include applications 410 (applications 410A through 401N are generally referred to as the application 410), location managers 420A and B, file storage 430A and B, and IDL (Interface Description Language) modules 450A and B. The IDL modules 410A and B, allow both computing devices 100C and 100D to communicate with each other and the network 230.

Remote Server Structure

Figure 5:
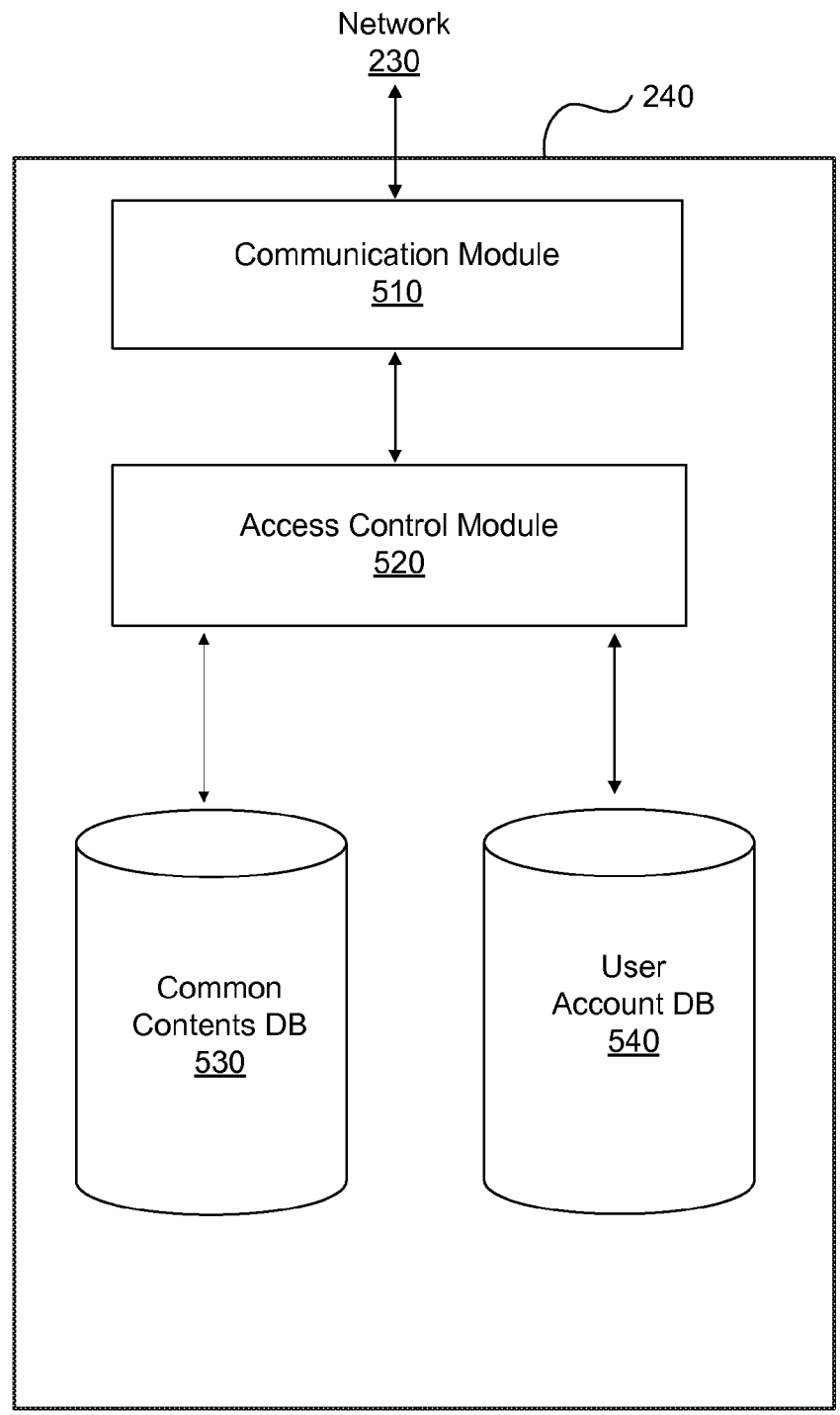
FIG. 5 is a block diagram illustrating a remote server according to one embodiment of the present invention.

Referring now to FIG. 5, the remote server 240 includes, among other components, a communication module 510, an access control module 520, a common contents database 530, and a user account database 540. The communication module 510 communicates with the computing devices 100 and content sources 222 through the network 230. The access control module 520 controls users' access to data available from the remote server 240. The user may have access to different data stored on the remote server 240. In one embodiment, all of the users have access to the data stored on the common contents database 530. As explained below, the users also have access to the data stored in his account on the user account database 540. The access control module 520 may also prevent conflict of the location information as explained below in detail with reference to FIG. 9. The common contents database 530 may store various content items such as web pages and audio files that are available to anyone accessing the remote server 240. Each of these functional components can be implemented separately or can be implemented together. For example, the common contents database 530 and the user account database 540 can be implemented as one module. Moreover, each component, whether alone or in combination with other components, can be implemented for example, in software, hardware, firmware or any other combination thereof.

Figure 6:
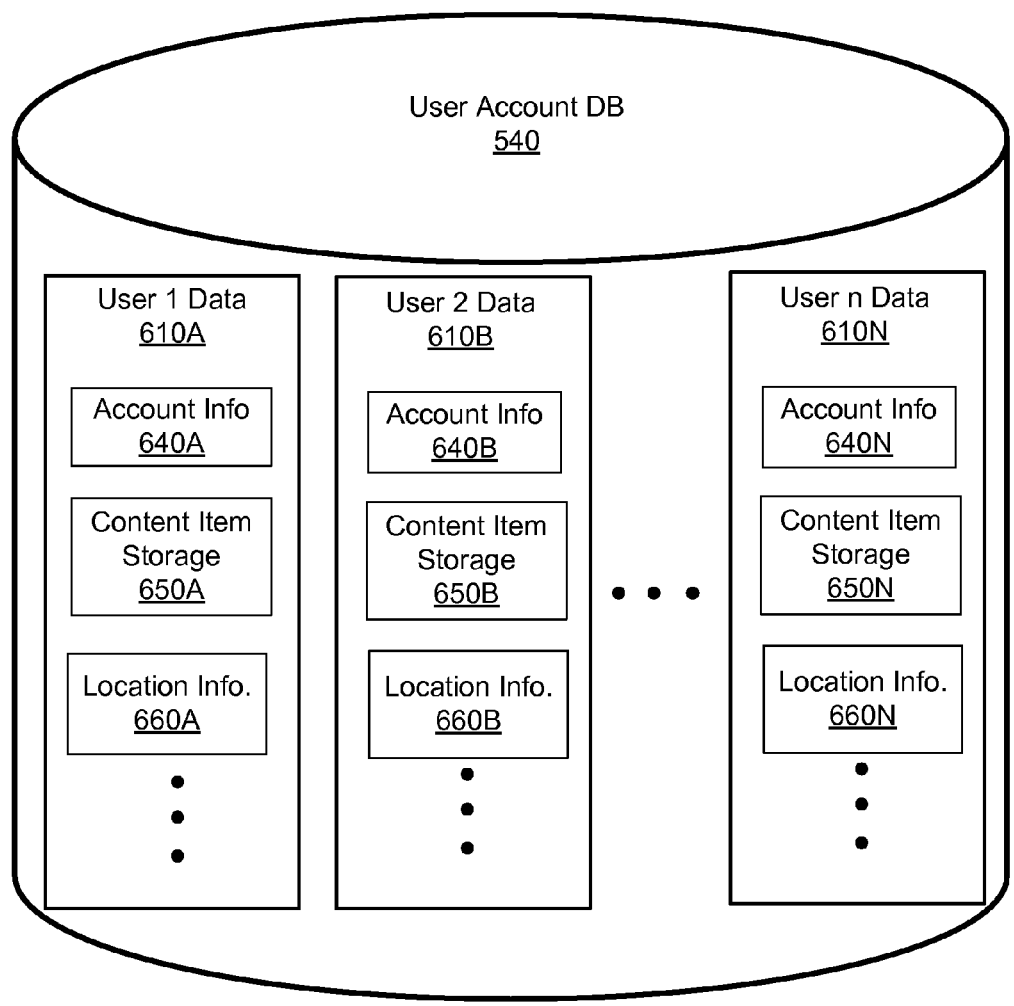
FIG. 6 is a diagram showing a structure of the user account database of the remote server of FIG. 5.

FIG. 6 is a diagram showing a structure of the user account database 540 of the remote server 240. User data 610A through user data 610N, account information 640A through 640N, file storage 650A through 650N, and location information 660A through 660N are generally referred to as user data 610, account information 640, file storage 650, and location information 660, respectively. The user account database 540 includes the user data 610 classified according to users. The user data 610 includes, among other data, the account information 640, the file storage 650, and the location information 660. The account information 640 may include user's ID and password for accessing the content sources 222 for caching the content items from the content sources 222. The cached content items are stored on the content item storage 650 so that the user can make faster access to the content items. As explained above with reference to FIG. 3, the location information 660 stores the location where the user previously left off from the content item. A user may access only data stored in his account and may not access to data stored on other users' user data. For example, user 1 may have access only to user 1 data 610A but not to user 2 data 610B. In another embodiment, a group profile can be used which allows users belonging to a group to access other members' user data 610. Each of these database components can be implemented separately or can be implemented together. For example, the file storage 650 and the location information 660 can be implemented as one database component.

Method of Accessing Content Item Using the Remote Server

Referring to FIGS. 2 and 3, when the user uses the application 310 to access a content item stored on the file storage 330 of the computing device 100, the application 310 sends a message to the location manager 320 requesting access to the content item. The location manager 320 then requests location information (corresponding to the content item and the user) from the remote server 240. If the location information is stored on the remote server 240, the remote server 240 sends the location information to the location manager 320. Then, the location manager 320 sends the location information to the application 310. Upon receiving the location information from the application 310, the application 310 loads the content item from the file storage 330 and starts the content item from the location indicated by the location information. When the user discontinues access to the content item, the application 310 notifies the location manager 320 of the location in the content item where the access was discontinued. Then the location manager 320 updates the location information and sends it to the remote server 240. Upon receiving the updated location information, the remote server 240 stores the location information.

If the location information is not available from the remote server 240, the remote server notifies unavailability to the location manager 320. In response, the location manager 320 notifies the unavailability to the application 310, which means that the content items should start from the beginning. When the user discontinues access to the content item, the application 310 notifies the location where the user discontinued access. Upon receiving the notice from the application 310, the location manager generates new location information indicating the discontinued location in the content item. The new location information is then sent to the remote server 240 for storing.

Figure 7A:
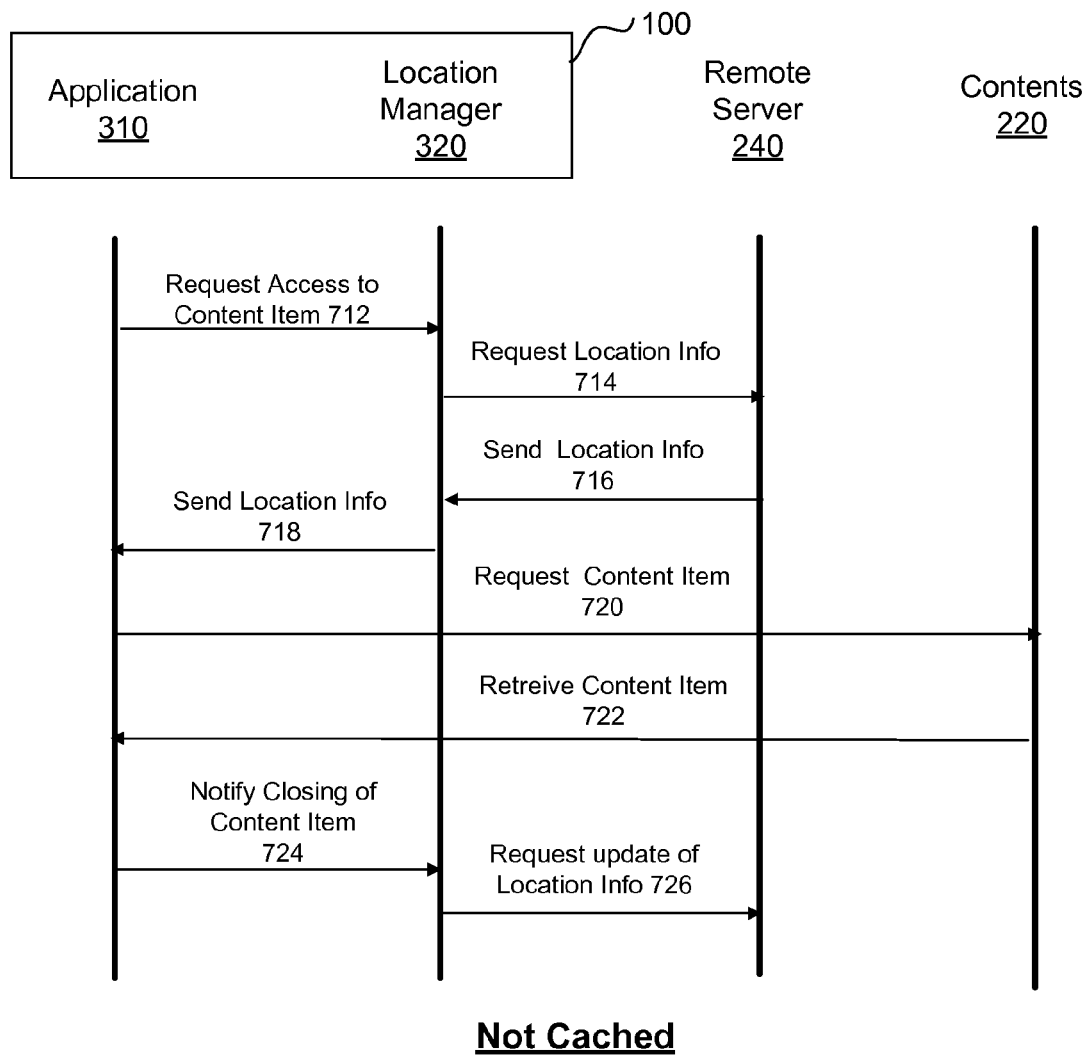
FIG. 7A is a diagram showing communication between the computing device, the remote server, and contents when the content item is not cached on the remote server.

FIG. 7A is a diagram showing communication between the computing device 100, the remote server 240, and contents 220 when the content item is not cached on the remote server 240. In FIG. 7A, communication to and from the communication module 310 and the file storage 330 has been omitted for the sake of clarity. A person skilled in the art will recognize that the content items received from the remote contents 220 or the remote server 240 can first be stored on the file storage 330, and then be accessed by the application 310. When the user uses the application 310 to access a content item from remote contents 220 that is not cached on the remote server 240, a request to access the content is sent 712 to the location manager 320 by the application 310. The location manager 320 requests 714 the location information (corresponding to the content item and the user) from the remote server 240. The remote server 240 retrieves the location information and sends 716 it to the location manager 320. The location manager 320 then sends 718 the location information to the application 310. Now that the application 310 has the location information, the application 310 requests 720 contents from the content sources 222, and retrieves 722 the content item from the contents 220. Then the application 310 starts the content item from the location of the content item indicated by the location information. After the user exits from the content item, the application 310 notifies 724 the exit location to the location manager 320. The location manager 320 then updates the location information and sends it to the remote server 240 to request 726 update of the location information stored on the remote server 240.

Figure 7B:
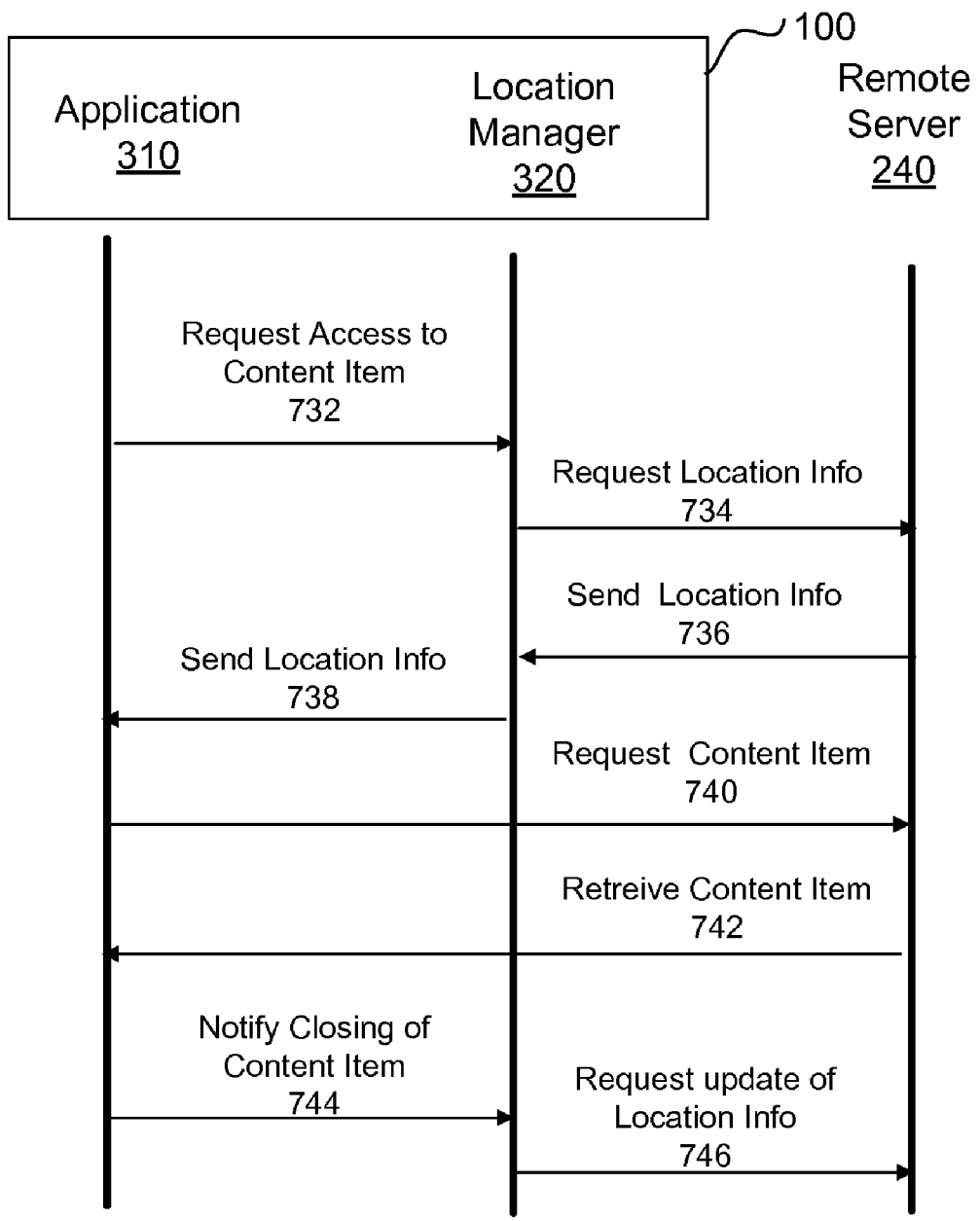
FIG. 7B is a diagram showing communication between the computing device, and the remote server when the content item is cached on the remote server.

FIG. 7B is a diagram showing communication between the computing device 100 and the remote server 240 when the content item is cached on the remote server 240. Like FIG. 7A, communication to and from the communication module 310 and the file storage 330 has been omitted from FIG. 7B for the sake of clarity. When the user uses the application 310 to access a content item cached on the remote server 240, a request to access the content is sent 732 to the location manager 320 by the application 310. The location manager 320 requests 734 the location information (corresponding to the content item and the user) from the remote server 240. The remote server 240 retrieves the location information and sends 736 it to the location manager 320. The location manager 320 then sends 738 the location information to the application 310. Then the application 310 requests 740 contents from the remote server 240 and retrieves 742 the content item from the remote server 240. The application 310 starts the content item from the location of the content item indicated by the location information. After the user exits the content item, the application 310 notifies 744 the exit location to the location manager 320. The location manager 320 then updates the location information and sends it to the remote server 240 to request 746 update of the location information stored on the remote server 240.

Conflict Resolution

Conflict may arise when the same content is accessed by a user on different computing devices simultaneously. Referring to FIG. 2, when the remote server 240 receives a request from a computing device while the content item is being accessed by another computing device, the remote server 240 may resolve the conflict using various schemes well known in the art. The access control module 520 of the remote server 240 implements the conflict resolution by allowing or denying access to the content item by the computing device 100.

Figure 8:
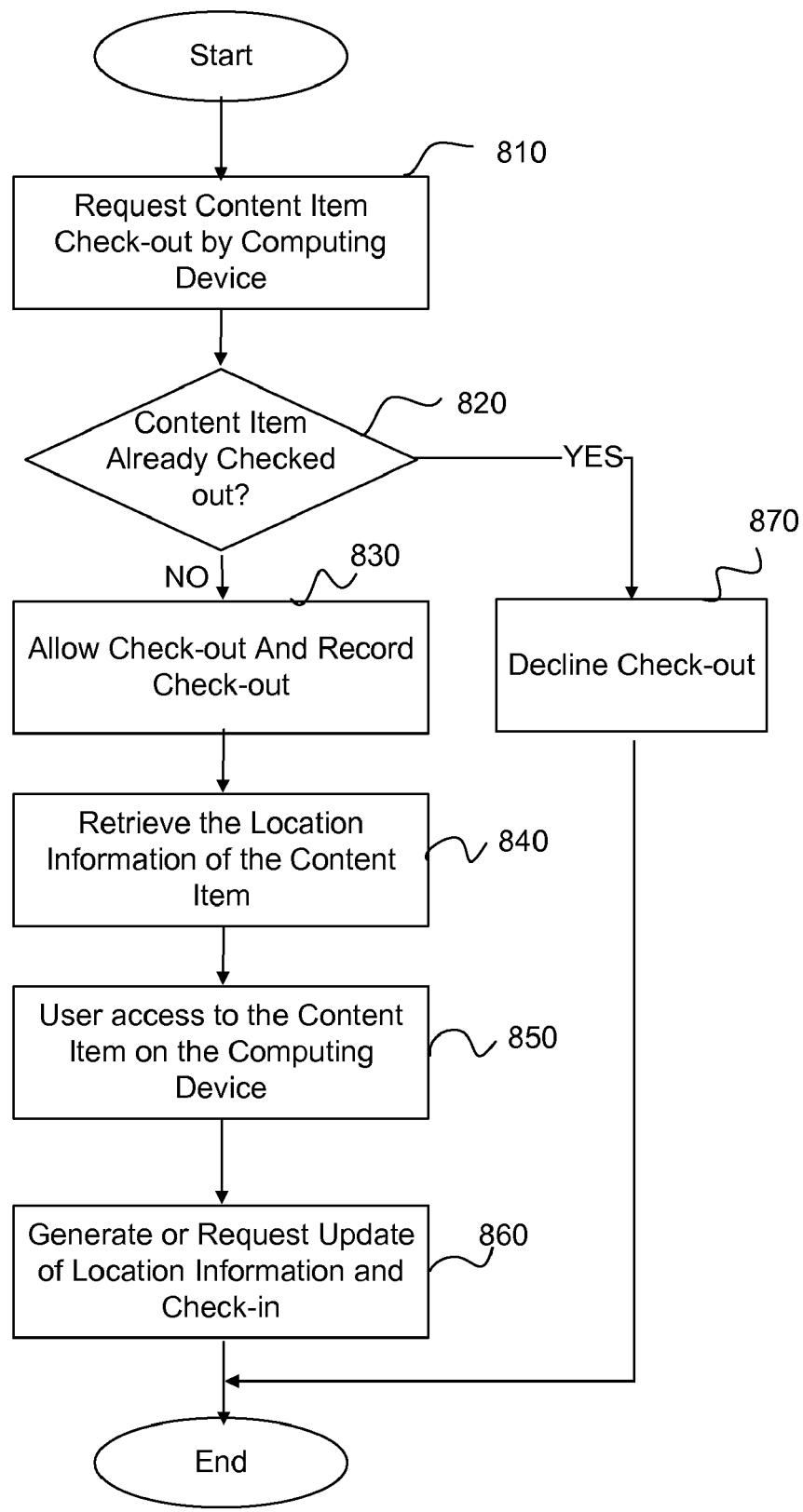
FIG. 8 is a flow chart showing the method of sharing location information according to one embodiment of the present invention where only one session is allowed for a content item.

FIG. 8 is a flow chart showing the method of sharing location information according to one embodiment where conflicts are prevented by allowing only one session for a content item. When the user attempts to access the content item on a computing device 100, the computing device 100 requests 810 check-out of the content item to a remote server 240. The remote server 240 determines if the requested content items has already been checked out by a user. If not, the remote server 240 allows 830 the computing device 100 to access the content item and records the check-out of the content item. The remote server 240 retrieves 840 the location information from the user account database 540 and sends it to the computing device 100. Then the user can access 850 the content item on the computing device 100. When the user exits the content item, the computing device 100 generates (if the content item was accessed for the first time) or updates 860 the location information indicating the exit location. The location information is sent to the remote server 240 and the content item is checked-in 860 for access by the user in a subsequent session.

In another embodiment, multiple sessions are allowed to run simultaneously on different computing devices. In this case, the maximum number of sessions that can run simultaneously may or may not be set.

Alternative Embodiments

Figure 9:
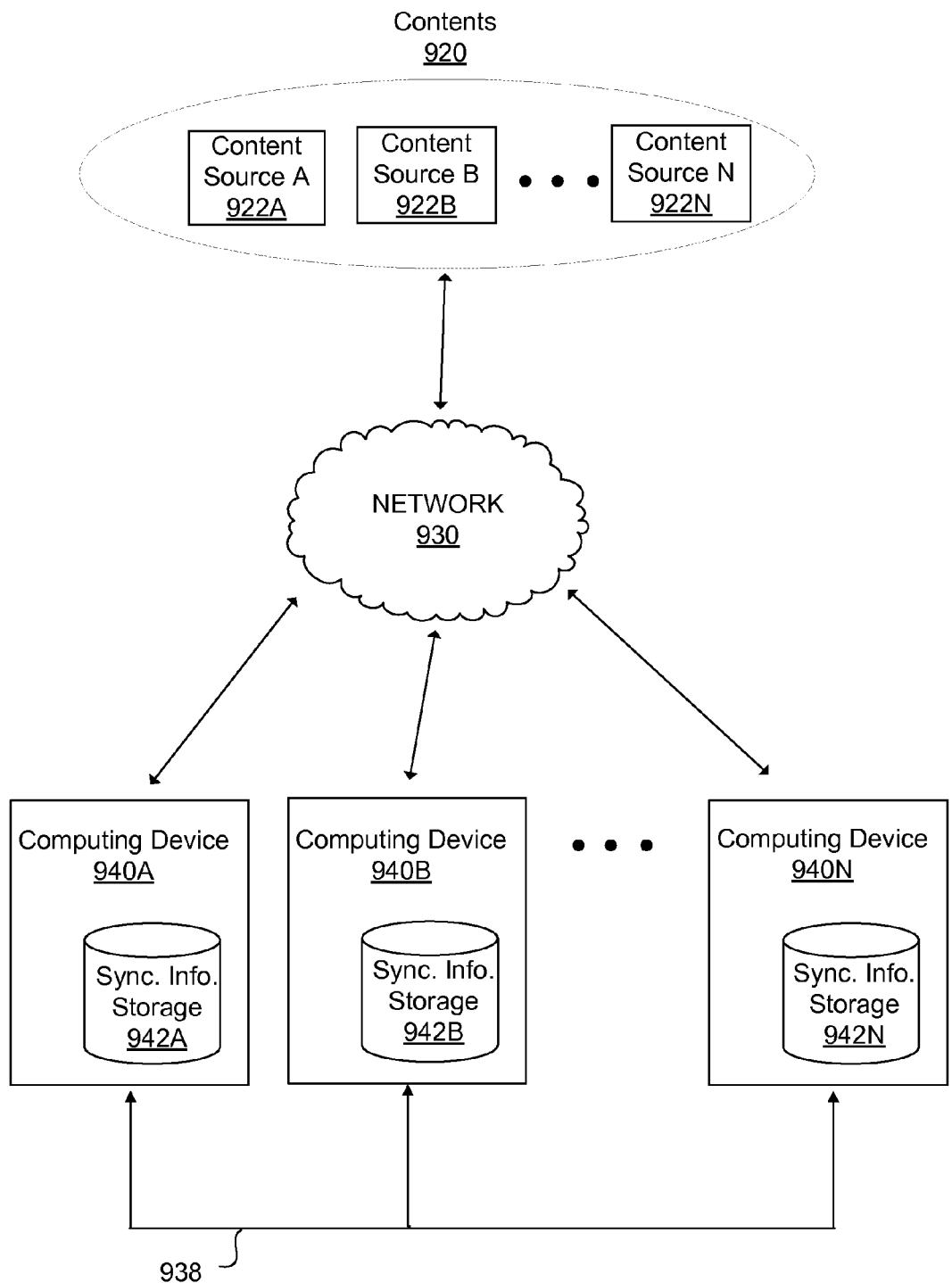
FIG. 9 is a diagram showing synchronization of the computing devices using peer-to-peer communication.

In one embodiment, peer-to-peer synchronization that does not involve a remote server is used. FIG. 9 shows an embodiment using peer-to-peer communication to synchronize the location information. The computing device 940 can use conventional synchronization schemes that is well known in the art using a peer-to-peer channel 938 to synchronize the location information between the computing devices 940. The location information is stored on a synchronization information storage 942 of the computing devices 940. As explained with reference to FIG. 2, the computing devices 940 can communicate with the remote contents 920 (stored on content sources 922A through 922N) through the network 930.

In the above embodiments, the content items were accessed by the same application operating on different computing devices. Most content items, however, may be viewed by more than one applications. For example, a movie file can be viewed by Windows Media Player as well as Quicktime. For such a content item that can be accessed in different applications, the location information can be used by different applications so that the user can continue from his previous session of the content item.

Figure 10:
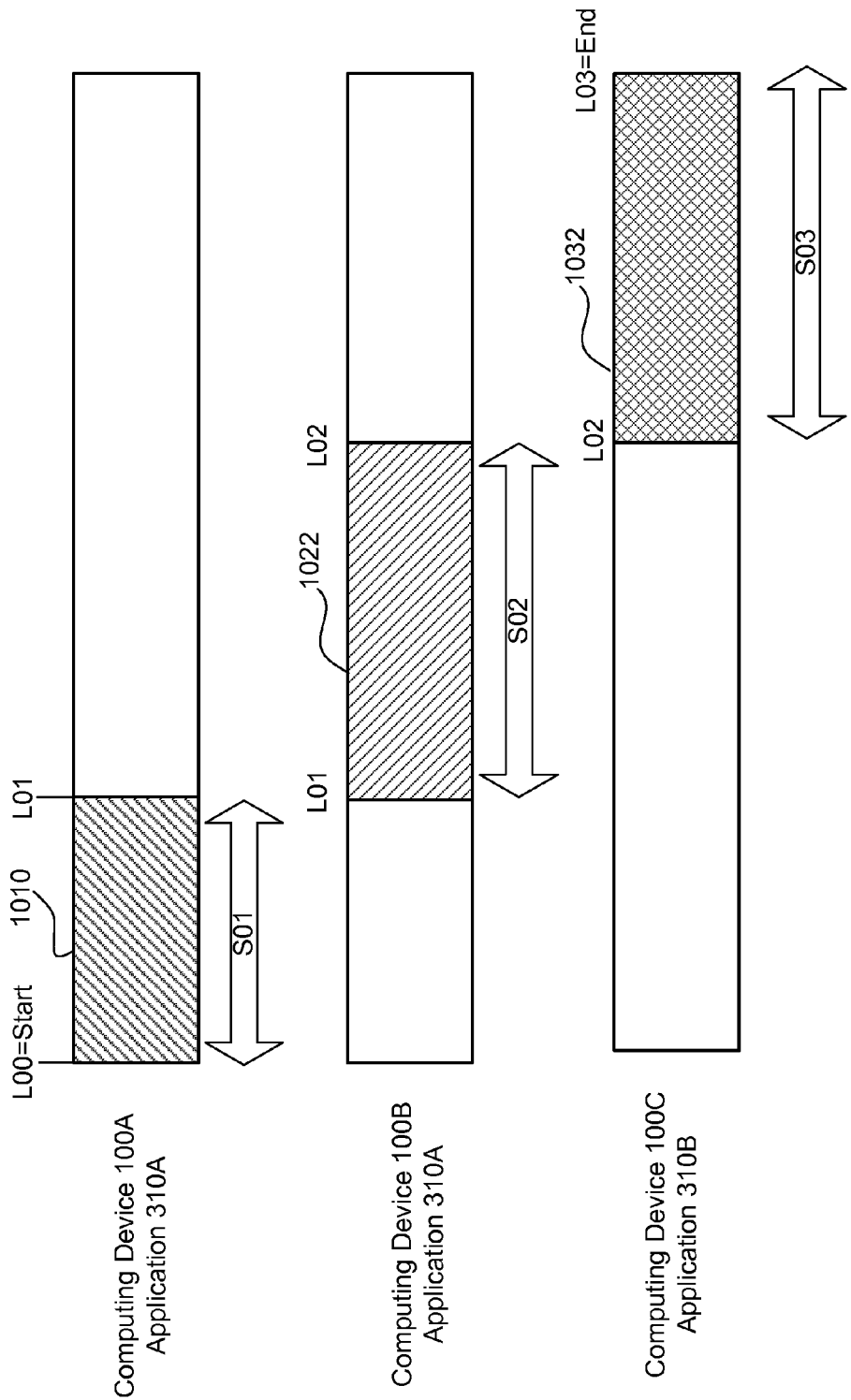
FIG. 10 is a diagram illustrating sessions for accessing a content item by a user using different application operating on identical or different computing devices.

FIG. 10 is a diagram illustrating sessions for accessing a content item using different applications. In session S01, the computing device 100A accesses a portion 1010 of the content item using a application 310A, and exits at a location L01 of the content item. In a subsequent session, the user accesses a portion 1022 of the content item on a different computing device 100B using the same application 310A, and exits at a location L02 of the content item. For example, the application 310A is Windows Media Player operating on a desktop computer (computing device 100A) and a PDA (computing device 100B), both having the same Microsoft Windows operating system. In session 03, the user may access a portion 1032 of the content item on a computing device 100C using a application 310B. For example, the application can be Quicktime running on a laptop computer with a Linux operating system (computing device 100C). Even when different applications are used on different computing devices, the location information can be used by different computing devices so that the user can continue the content item from a location where he previously left off.

As recognized through the example of the computing devices and the remote server described herein, the various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a software configured multimedia control mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for accessing static content items from multiple computing devices, the method comprising:

receiving a request to access a static content item on a first computing device, the static content item comprising two or more pages of information;

receiving location information for the static content item at the first computing device from a remote computing device over a network, the location information separate from the static content item and indicating a location within the two or more pages of information in the static content item of information in the static content item where a user discontinued access to the static content item at a second computing device;

the first computing device determining the location of static content item from which to start accessing the static content item based on the received location information;

accessing the static content item on the first computing device at the determined location in the static content item corresponding to the location information responsive to determining the location of the static content item; and displaying the static content item to the user at the determined location.

2. The method of claim 1, the method further comprising:

discontinuing access to the static content item at the first computing device; and updating the location information based on a location in the content item where the user discontinued the static content item at the first computing device.

3. The method of claim 1, wherein accessing the location information comprises retrieving the static content item from a file storage within the first computing device.

4. The method of claim 1, wherein accessing the location information comprises retrieving the static content item from a third-party service provider.

5. The method of claim 1, the method further comprising:

determining whether the static content item is being accessed by the second computing device; and denying access to the static content item by the first computing device responsive to the content item being accessed by the second computing device.

6. The method of claim 1, further comprising:

storing the static content item in its entirety on the first computing device for accessing on the first computing device.

7. The method of claim 1, further comprising receiving the static content item from a content source located remote from the first computing device.

8. The method of claim 1, wherein the static content item comprises e-books, web pages, and documents.

9. A non-transitory computer readable medium structured to store instructions executable by a processor in a first computing device, the instructions, when executed cause the processor to:

receive a request to access a static content item on the first computing device, the static content item comprising two or more pages of information;

receive location information for the static content item at the first computing device from a remote computing device over a network, the location information separate from the static content item and indicating a location within the two or more pages of information in the static content item of information in the static content item where a user discontinued access to the static content item at a second computing device;

determine the location of static content item from which to start accessing the static content item based on the received location information;

access the content item on the first computing device at the determined location in the static content item corresponding to the location information responsive to determining the location; and display the static content item to the user.

10. The computer readable storage medium of claim 9, wherein the stored instructions further causes the processor to:

discontinue access to the static content item at the first computing device; and update the location information based on a location in the static content item where the user discontinued the static content item at the first computing device.

11. The computer readable storage medium of claim 9, wherein the stored instructions causes the processor to retrieve the static content item from a file storage within the first computing device.

12. The computer readable storage medium of claim 9, wherein the stored instructions causes the processor to retrieve the static content item from a third-party service provider.

13. The computer readable medium of claim 9, wherein the stored instructions further causes the processor to store the static content item in its entirety on the first computing device for accessing on the first computing device.

14. The computer readable medium of claim 9, wherein the stored instructions further causes the processor to receive the static content item from a content source located remote from the first computing device.

15. The computer readable medium of claim 9, wherein the stored instructions further causes the processor to receive the static content item from a content source located remote from the first computing device.

16. The method of claim 9, wherein the static content item comprises e-books, web pages, and documents.

17. A method for accessing static content items on multiple computing devices, the method comprising:

accessing a static content item at a first computing device, the static content item comprising two or more pages of information;

discontinuing the accessing of the static content item at the first computing device;

generating location information separate from the static content item and indicating a location within the two or more pages of information in the static content item information in the static content item at which access to the static content item was discontinued on the first computing device;

sending the location information to a remote computing device over a network for retrieval by a second computing device, the second computing device determining the location in the static content item from which to start accessing the static content item based on the retrieved location information; and displaying the static content item to the user at the determined location.

18. The method of claim 17, wherein the method further comprises determining whether to allow the second computing device to access the static content item.

19. The method of claim 17, wherein the method further comprises caching the static content item on the remote computing device.

20. The method of claim 17, wherein at least one of the multiple computing devices is a mobile device.

21. The method of claim 17, further comprising:

storing the static content item in its entirety on the first computing device for accessing on the first computing device.

22. The method of claim 17, wherein the static content item comprises e-books, web pages, and documents.

23. A mobile device operable to access a static content item, the mobile device comprising:

a memory for storing first location information for a static content item accessible by the mobile device, the static content item comprising two or more pages of information, the first location information separate from the static content item and indicating a location within the one or more pages of information in the static content item of information in the static content item where a user discontinued the static content item at the mobile device;

a location information manager for generating the first location information responsive to the user discontinuing access to the static content items on the mobile device;

a communication module coupled to the location information manager, the communication module operable to send the first location information to a remote computing device over a network for retrieval by another mobile device, the other mobile device determining the location from which to start accessing the static content item based on the first location information; and an application for displaying the static content item to the user at the determined location.

24. The mobile device of claim 23, wherein the communication module is operable to receive second location information from the remote computing device, the location information manager further configured to provide the second location information to the applications running on the mobile device for accessing a static content item associated with the second location information at a location of the static content item corresponding to the second location information.

25. The mobile device of claim 23, wherein the file storage module stores the static content item in its entirety.

26. The method mobile device of claim 23, wherein the mobile device receives the static content item from a content source remote from the mobile device.

27. The method of claim 23, wherein the static content item comprises e-books, web pages, and documents.

* * * * *

UNITED STATES PATENT AND TRADEMARK OFFICE
CERTIFICATE OF CORRECTION

| | | |
|---|---|---|
| PATENT NO. | : 7,870,272 B2 | Page 1 of 1 |
| APPLICATION NO. | : 11/567178 | |
| DATED | : January 11, 2011 | |
| INVENTOR(S) | : David Berkowitz et al. | |

It is certified that error appears in the above-identified patent and that said Letters Patent is hereby corrected as shown below:

In column 12, line 61, in Claim 1, after "item" delete "of information in the static content item".

In column 13, line 8, in Claim 2, delete "the" and insert -- wherein the --, therefor.

In column 13, line 20, in Claim 5, delete "the" and insert -- wherein the --, therefor.

In column 13, line 48, in Claim 9, after "item" delete "of information in the static content item".

In column 13, line 59, in Claim 9, delete "user." and insert -- user at the determined location. --, therefor.

In column 14, lines 33-34, in Claim 17, after "item" delete "information in the static content item".

In column 14, line 67, in Claim 23, delete "one" and insert -- two --, therefor.

In column 15, line 1, in Claim 23, after "item" delete "of information in the static content item".

In column 16, line 12, in Claim 26, before "mobile" delete "method".

Signed and Sealed this
Eighth Day of November, 2011

David J. Kappos
*Director of the United States Patent and Trademark Office*